(12) United States Patent
Piratla et al.

(10) Patent No.: US 8,712,126 B2
(45) Date of Patent: Apr. 29, 2014

(54) WEB-BASED SYSTEM AND METHOD FOR VIDEO ANALYSIS

(75) Inventors: Nischal M. Piratla, Tilaknagar (IN); Lalit Keshav Mestha, Fairport, NY (US); Meera Sampath, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 181 days.

(21) Appl. No.: 13/417,979

(22) Filed: Mar. 12, 2012

(65) Prior Publication Data
US 2013/0236073 A1 Sep. 12, 2013

(51) Int. Cl.
*G06K 9/00* (2006.01)
(52) U.S. Cl.
USPC .............................. 382/128; 128/922; 715/700
(58) Field of Classification Search
USPC .................. 382/100, 128, 129, 130, 131, 132; 128/922; 378/4–27; 715/700, 716, 719, 715/744, 746, 810, 817, 825, 828; 702/68
See application file for complete search history.

(56) References Cited

U.S. PATENT DOCUMENTS

| | | | | |
|---|---|---|---|---|
| 5,909,548 A * | 6/1999 | Klein et al. | ........... | 709/217 |
| 5,974,235 A * | 10/1999 | Nunally et al. | ........... | 709/202 |
| 6,674,879 B1 * | 1/2004 | Weisman et al. | ........... | 382/128 |
| 6,768,811 B2 * | 7/2004 | Dinstein et al. | ........... | 382/128 |
| 7,313,762 B2 * | 12/2007 | Bozdagi et al. | ........... | 715/719 |
| 7,319,780 B2 * | 1/2008 | Fedorovskaya et al. | ........... | 382/128 |
| 7,765,487 B2 * | 7/2010 | Cable | ........... | 715/764 |
| 2008/0235284 A1 | 9/2008 | Aarts et al. | | |
| 2009/0322881 A1 * | 12/2009 | Shu et al. | ........... | 348/148 |

OTHER PUBLICATIONS

Online Speech Training, http://speechyou.com, Feb. 8, 2012, two pages.
Philips Vital Signs Camera App, http://www.youtube.com/watch?v=2M7AFoqJyDI&feature=player, Feb. 8, 2012, two pages.
Mestha et al., "Removing Environment Factors From Signals Generated From Video Images Captured for Biomedical Measurements", U.S. Appl. No. 13/401,207, filed Feb. 21, 2012.
Cardoso et al., "Video-Based Determination of Vehicle Component Failure Due to Overheating", U.S. Appl. No. 13/401,286, filed Feb. 21, 2012.
Mestha et al., "Deriving Arterial Pulse Transit Time From a Source Video Signal", U.S. Appl. No. 13/401,286, filed Feb. 21, 2012.

(Continued)

*Primary Examiner* — Anand Bhatnagar
(74) *Attorney, Agent, or Firm* — Philip E. Blair; Fleit Gibbons Gutman Bongini & Bianco P.L.

(57) ABSTRACT

What is disclosed is a web-based system which comprises, in part, video analysis modules for performing different types of analysis services on a video, and a server in network communication with a user's computing device. A user selects one or more menu options displayed on a webpage. Each of the menu options is associated with a respective video analysis available to the user. The user makes their election and, within the same session, uploads to the server a video desired to be analyzed with respect to each of the video analysis services selected by the user. Once the server has obtained the user's selection(s) and has received the uploaded video, the server communicates the video to each video analysis module associated with each of the respective analysis services. Upon each completion of the video analysis, the results are communicated back to the user. Various embodiments are disclosed.

25 Claims, 10 Drawing Sheets

(56) References Cited

OTHER PUBLICATIONS

Mestha et al., "Estimating Cardiac Pulse Recovery From Multi-Channel Source Data Via Constrained Source Separation", U.S. Appl. No. 13/247,683, filed Sep. 28, 2011.

Mestha et al., "Systems and Methods for Non-Contact Heart Rate Sensing", U.S. Appl. No. 13/247,575, filed Sep. 28, 2011.

Mestha et al., Filtering Source Video Data Via Independent Component Selection, U.S. Appl. No. 13/281,975, filed Oct. 26, 2011.

Mestha et al., "Method for Classifying a Pixel of a Hyperspectral Image in a Remote Sensing Application," U.S. Appl. No. 13/023,310, filed Feb. 8, 2011.

Dalal et al., "Vehicle Occupancy Detection Via Single Band Infrared Imaging", U.S. Appl. No. 13/312,414, filed Dec. 6, 2011.

Fan et al., "Front Seat Vehicle Occupancy Detection Via Seat Pattern Recognition," U.S. Appl. No. 13/215,401, filed Aug. 23, 2011.

Wang et al., "Determining a Total Number of People in an IR Image Obtained Via an IR Imaging System", U.S. Appl. No. 12/967,775, filed Dec. 14, 2010.

Wang et al., "Determining a Number of Objects in an IR Image", U.S. Appl. No. 13/086,066, filed Apr. 13, 2011.

Xu et al., "Monitoring Respiration With a Thermal Imaging System", U.S. Appl. No. 13/103,406, filed May 9, 2011.

Mestha et al., "Hyperspectral Image Reconstruction Via a Compressed Sensing Framework", U.S. Appl. No. 13/180,895, filed Jul. 12, 2011.

Wang et al., "Post-Processing a Multi-Spectral Image for Enhanced Object Identification", U.S. Appl. No. 13/324,368, filed Dec. 13, 2011.

Xu et al., "Subcutaneous Vein Pattern Detection Via Multi-Spectral IR Imaging in an Identity Verification System", U.S. Appl. No. 13/087,850, filed Apr. 15, 2011.

Xu et al., "System and Method for Object Identification and Tracking", U.S. Appl. No. 13/247,343, filed Sep. 28, 2011.

Cardoso et al., "Minimally Invasive Image-Based Determination of Carbon Dioxide (CO2) Concentration in Exhaled Breath", U.S. Appl. No. 13/246,560, filed Sep. 27, 2011.

Cardoso et al., "Vehicle Emissions Testing and Toll Collection System", U.S. Appl. No. 13/352,683, filed Jan. 18, 2012.

Skaff et al., "Estimating a Visible Vector Representation for Pixels in an Infrared Image", U.S. Appl. No. 13/364,835, filed Feb. 2, 2012.

* cited by examiner

WEB-BASED SYSTEM AND METHOD FOR VIDEO ANALYSIS

TECHNICAL FIELD

The present invention is directed to web-based systems and methods which receive a user-uploaded video and then analyze that video with respect to one or more user-selected menu options.

BACKGROUND

Sophisticated video processing techniques have been developed by the Xerox Corporation. One method involves analyzing a video captured using a RGB camera or an infrared (IR) video imaging system to determine the composition of the material of an object in that video. Other teachings have been directed towards medical diagnostics such as analyzing an infrared image to determine an amount of $CO_2$ concentration in a patient's breath or to determine the frequency of a patient's cardiac pulse. Other teachings have been directed towards detecting the number of occupants in a motor vehicle for HOV lane enforcement. Still others have been directed towards vehicle emissions testing via video analysis. Image processing techniques have a wide array of uses but are not readily available to the average user with a standard RGB or infrared video camera.

What is needed is a web-based system and method which enables a user to upload a video to a server and select from among a plurality of sophisticated video analysis methods from various menu options to have their video analyzed and the results communicated back to them.

BRIEF SUMMARY

What is disclosed is a web-based system which effectuates an online service that enables users thereof to have a video of a person or subject of interest analyzed with respect to a set of user-selected menu options. The present web-based video analysis service effectuates services solutions presently unavailable outside of corporate research and universities. Through an implementation of the teachings hereof, persons can capture video, upload that video to the present web-based service, and select from a variety of video analysis menu options, with the results communicated back to them upon completion.

In one example embodiment, the present web-based system comprises two primary components, 1) a plurality of video analysis modules performing different types of video analysis services on a user-provided video, and 2) a server in bi-directional network communication with the user's computing device. Operationally, a user selects one or more menu options displayed on a webpage assembled and provided by the server. Each of the menu options is associated with a video analysis service. The user makes their selection and uploads a video desired to be analyzed with respect to each of the selected options. Once the server has obtained the user's selection and has received the uploaded video, the server communicates the video to the video analysis modules associated with each of the respective selected menu options. Upon each module's completion of their respective analysis, the results are communicated back to the user. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
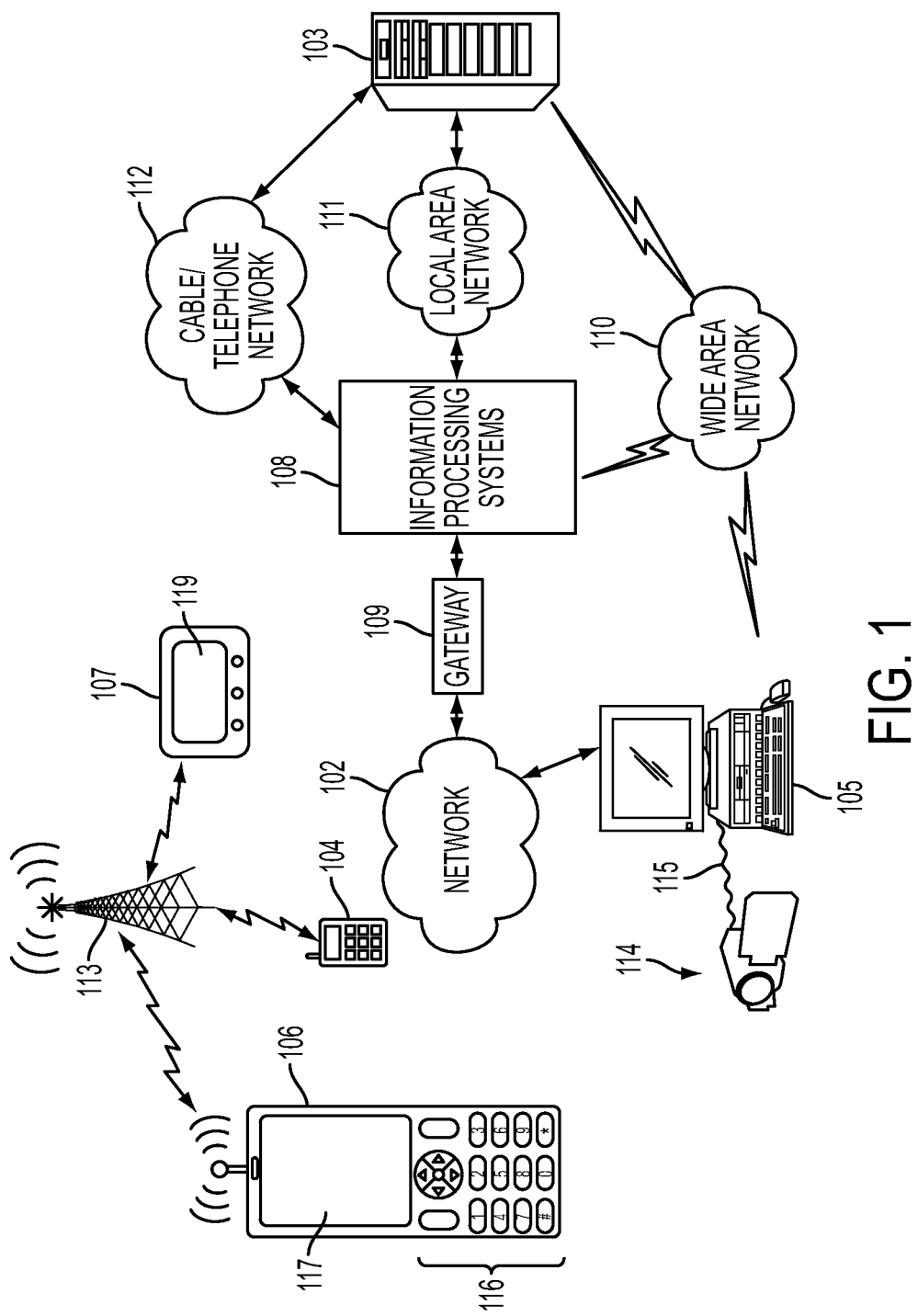
FIG. 1 illustrates one embodiment of a wireless system through which a user can use various computing devices to communicate with a server in accordance with various aspects of the present system and method.

What is disclosed is a web-based system and method which effectuates an online video analysis service for analyzing a user's video according to user-selected menu options.

INCORPORATED REFERENCES

The following U.S. patents, U.S. patent applications, and Publications are incorporated herein in their entirety by reference.

"Removing Environment Factors From Signals Generated From Video Images Captured For Biomedical Measurements", U.S. patent application Ser. No. 13/401,207, by Mestha et al., which discloses a system and method for analyzing a video such that undesirable periodic signals and random background noise can be removed from that video. (Noise Removal Module).

"Video-Based Determination Of Vehicle Component Failure Due To Overheating", U.S. patent application Ser. No. 13/419,605, by Cardoso et al., which discloses a system and method for analyzing a video such that temperature can be estimated for a component in the video. (Component Temperature Estimation Module).

"Deriving Arterial Pulse Transit Time From A Source Video Image", U.S. patent application Ser. No. 13/401,286, by Mestha, which discloses a system and method for analyzing a video such that a pulse transit time can be determined for a person in that video. (Pulse Transit Time Determination Module).

"Estimating Cardiac Pulse Recovery From Multi-Channel Source Data Via Constrained Source Separation", U.S. patent application Ser. No. 13/247,683, by Mestha et al., which discloses a system and method for analyzing a video such that a cardiac pulse rate can be estimated for a person captured in that video. (Cardiac Pulse Recovery Module).

"Systems And Methods For Non-Contact Heart Rate Sensing", U.S. patent application Ser. No. 13/247,575, by Mestha et al., which discloses a method for analyzing a video of a subject of interest to determine the subject's heart rate. (Heart Rate Determination Module).

"Filtering Source Video Data Via Independent Component Selection", U.S. patent application Ser. No. 13/281,975, by Mestha et al., which discloses a system and method for analyzing a video such that the video can be reconstructed with certain content in the video is visually emphasized during playback. (Content Visual Enhancement Module).

"Method For Classifying A Pixel Of A Hyperspectral Image In A Remote Sensing Application", U.S. patent application Ser. No. 13/023,310, by Mestha et al., which discloses a system and method for analyzing a video such that objects in the video can be identified by their material composition via pixel classification. (Object Material Identification Module).

"Vehicle Occupancy Detection Via Single Band Infrared Imaging"", U.S. patent application Ser. No. 13/312,414, by Dalal et al., which discloses a system and method for analyzing a video such that the number of occupants in a vehicle traveling in a restricted lane can be determined. (Vehicle Occupancy Detection Module).

"Front Seat Vehicle Occupancy Detection Via Seat Pattern Recognition", U.S. patent application Ser. No. 13/215,401, by Fan et al., which discloses a system and method analyzing a video image of a motor vehicle to determine whether a front passenger seat of that vehicle is occupied. (Passenger Seat Analysis Module).

"Determining A Total Number Of People In An IR Image Obtained Via An IR Imaging System", U.S. patent application Ser. No. 12/967,775, by Wang et al., which discloses a system and method for analyzing a video to determine the number of people in the video. (Number of People Module).

"Determining A Number Of Objects In An IR Image", U.S. patent application Ser. No. 13/086,006, by Wang et al., which discloses a system and method for analyzing a video such that objects in the video can be separated from the surrounding background. (Object/Background Separation Module).

"Monitoring Respiration With A Thermal Imaging System", U.S. patent application Ser. No. 13/103,406, by Xu et al., which discloses a system and method analyzing a video such that the respiration of a subject of interest in that video can be determined. (Respiration Analysis Module).

"Hyperspectral Image Reconstruction Via A Compressed Sensing Framework", U.S. patent application Ser. No. 13/180,895, by Mestha et al., which discloses a system and method for reconstructing wavelength bands that were not imaged in a video captured using a hyperspectral camera. (Wavelength Band Reconstruction Module).

"Post-Processing A Multi-Spectral Image For Enhanced Object Identification", U.S. patent application Ser. No. 13/324,368, by Wang et al., which discloses a system and method for post-processing a multi-spectral image which has been pre-processed via a pixel classification method such that objects in the image are more correctly identified. (Multispectral Image Post-Processing Module).

"Subcutaneous Vein Pattern Detection Via Multi-Spectral IR Imaging In An Identity Verification System", U.S. patent application Ser. No. 13/087,850, by Xu et al., which discloses a system and method for analyzing a video for subcutaneous vein patterns such that a person in that video can be identified. (Subcutaneous Vein Pattern Analysis Module)

"System And Method For Object Identification And Tracking", U.S. patent application Ser. No. 13/247,343, by Xu et al., which discloses a system and method for analyzing a video to identify objects and to track those objects as they move across the scene. (Object Identification and Tracking Module).

"Minimally Invasive Image-Based Determination Of Carbon Dioxide ($CO_2$) Concentration In Exhaled Breath", U.S. patent application Ser. No. 13/246,560, by Cardoso et al., which discloses a system and method for analyzing a video such that a concentration of carbon dioxide ($CO_2$) in a person's exhaled breath can be determined. ($CO_2$ Concentration Analysis Module).

"Vehicle Emissions Testing And Toll Collection System", U.S. patent application Ser. No. 13/352,683, by Cardoso et al., which discloses a system and method for analyzing a video for vehicle exhaust emissions. (Exhaust Gas Emissions Analysis Module).

"Estimating A Visible Vector Representation For Pixels In An Infrared Image", U.S. patent application Ser. No. 13/364,835, by Skaff et al., which discloses a system and method for analyzing an infrared video captured using either a multi-spectral or a hyperspectral infrared camera system such that color can be accurately determined for pixels in those image frames. (Infrared Image Colorizing Module).

"Forensic Aspects Of Speech Patterns: Voice Prints, Speaker Profiling, Lie And Intoxication Detection", Dennis C. Tanner (Author), Matthew E. Tanner (Author), Lawyers & Judges Publishing Co., (January 2004), ISBN-13: 978-1930056404. (Voice Stress Analysis Module).

NON-LIMITING DEFINITIONS

A "video" refers to one or more images captured using a video camera. The video may further contain an audio signal.

A "video camera" is a device for capturing at least one image of a scene. The video camera may further capture an audio signal. Such a video camera may be a monochrome video camera for capturing black/white images, or a color video camera for capturing color images over channels corresponding to the visual primary colors, typically RGB, or a combination thereof. The video camera may comprise a single channel IR camera, a multi-spectral, or hyperspectral camera with sufficient spectral resolution such that material analysis can be conducted on the infrared video images capturing using such a camera system. Such an infrared camera can capture infrared video images in the wavelength ranges of any of: visible, Near Infrared (NIR), Short Wave Infrared (SWIR), Mid Wave Infrared (MWIR), and Long Wave Infrared (LWIR). The video camera may be a combination of an RGB camera and an infrared imaging device. One example video camera 114 is shown in FIG. 1 connected to computer 105 via cable 115.

Figure 4:
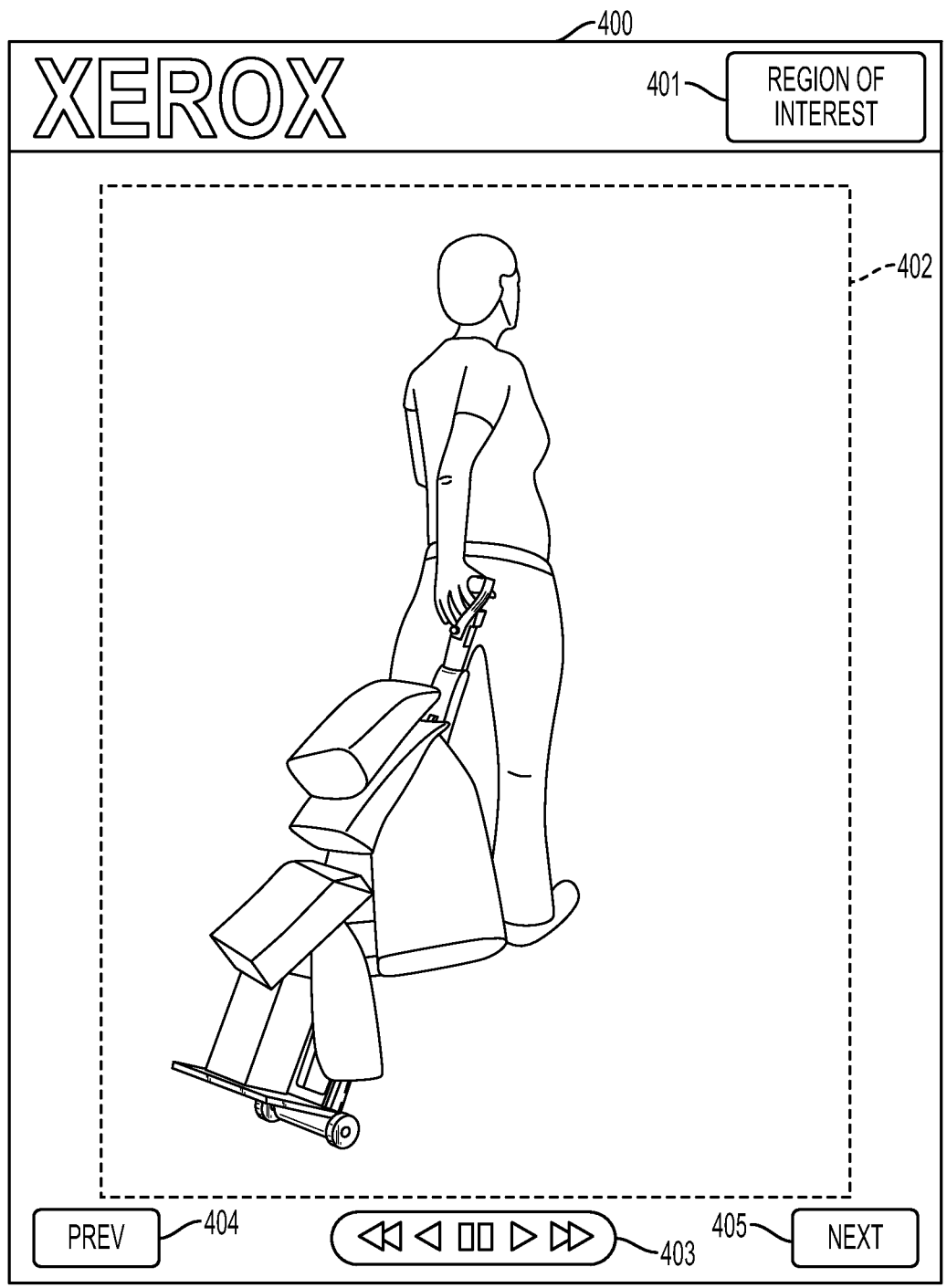
FIG. 4 illustrates one example embodiment of a display screen provided to the user upon the server having obtained a video intended to be analyzed.
Figure 8:
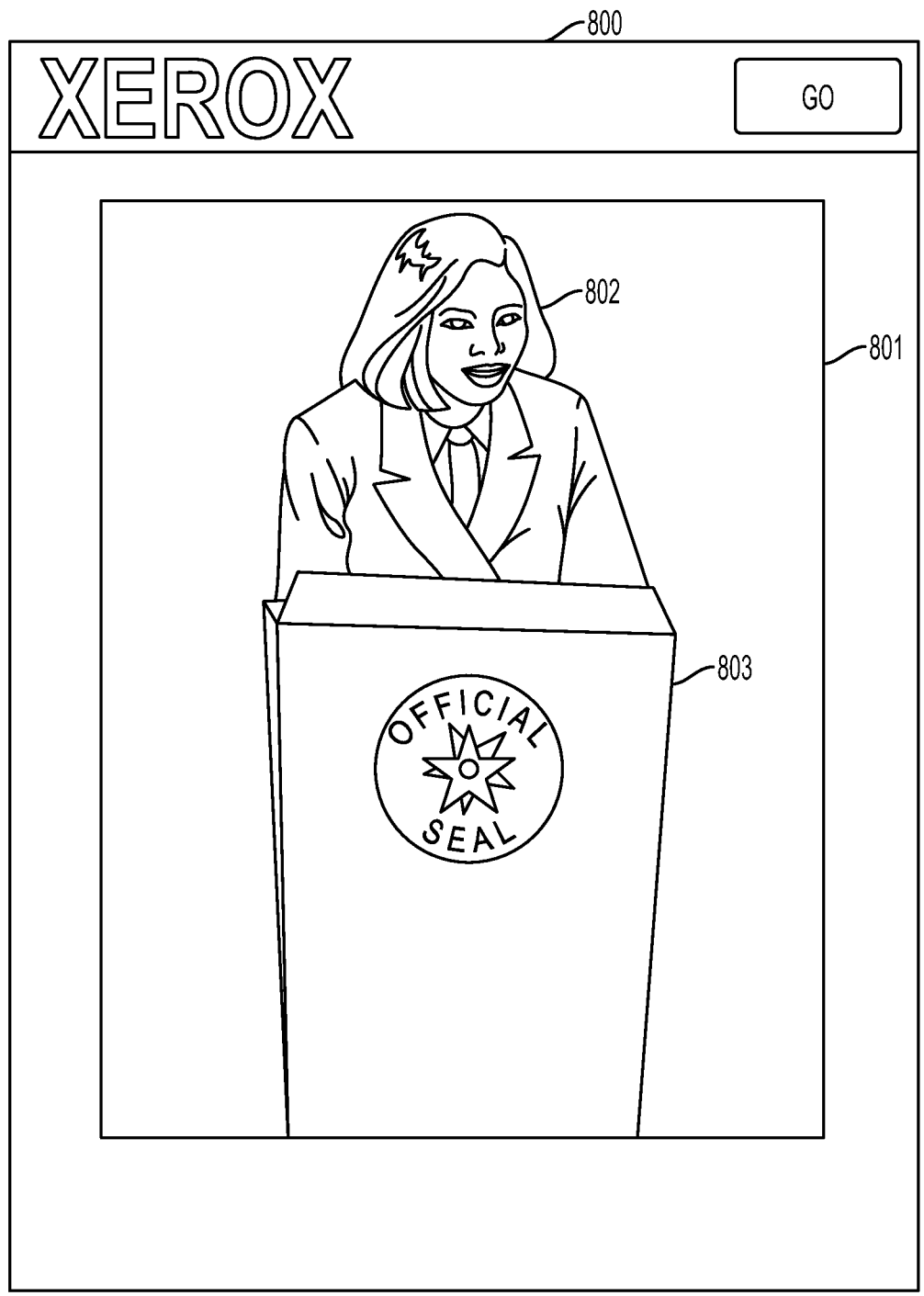
FIG. 8 illustrates another example embodiment of a display screen showing a video of a speaker giving a speech with the video having been provided to the server in real-time for video analysis.

A "subject of interest", as used herein, refers to any person or object captured in a video which is intended to be analyzed with respect to one or more user selected menu options, in accordance with the teachings hereof. The subject may be an object of interest captured in the video intended to be analyzed with respect to a material identification and/or for object tracking. Objects may be, for instance, a wheeled luggage carrying device containing various packages or a satchel being carried by a person of interest walking through an airport or a court yard. One example subject of interest is shown in FIGS. 4 and 8. Objects of interest may be the person's shirt, pants, shoes, belt, hat, and the like, such that these materials of interest can be analyzed and identified in the video. Materials of interest may be, for example, hair, skin, tissue, plastics, metals, composite materials, explosives, to name a few. The list of objects and materials that may be of interest to a user of the teachings hereof will vary widely and may depend, to a large extent, on the environment where the video of that object was taken such as, for instance, a courthouse, government office building, a hospital, an airport, a vehicle, to name a few. If the subject of interest is a person, the user hereof may desire to have a video of that person analyzed with respect to one or more user-selected physiological conditions such as, for instance, the person's cardiac pulse frequency, heart rate, blood flow, blood pressure, respiration rate, concentration of gases in exhaled breath, skin temperature, bodily movement, and the like, and/or have the audio portion of the video analyzed for voice stress analysis.

A "server" is a computer platform executing server software or housing server hardware which communicates a web page and web-based applications to a user's computing device over a network. One example server 103 is shown and discussed with respect FIGS. 1 and 2. The server is in communication with video analysis modules wherein a video is analyzed with respect to user selected menu options.

A "user's computing device" refers to any device capable of communicating with a server, as defined herein. Such a computing device can take a variety of forms including: a desktop computer, a laptop computer, a portable digital assistant (PDA), a handheld cellular device such as a iPhone or smartphone, and the like, all of which have a user interface configured to enable a user to select from among a plurality of menu options displayed on a display thereof such as a touchscreen, LCD, and the like, and to effectuate a communication with a server over a network. Example user computing devices are shown and discussed with respect to FIG. 1. Computing devices have a processor for executing machine readable program instructions for enabling the device's intended functionality, and a memory and storage media. The computing device used by the user to select menu option may be different than the computing device which communicates the video to the server, and further may be different from the computing device which receives the video analysis result.

A "video analysis module", in one embodiment, comprises a hardware device with at least one processor for executing machine readable program instructions for analyzing a video with respect to user-selectable menu options. A video analysis module may comprise, in whole or in part, a software application working alone or in conjunction with a hardware resource. Software applications executed in the performance of an analysis of a video or audio component thereof, may be partially or fully implemented using, for example, Java or an object-oriented software executable by processors on different hardware platforms. Any of these software applications may be emulated in a virtual environment as enabled by an operating system and specialized programs. Various aspects of any of the video analysis modules may also leverage off-the-shelf software applications. The subject matter of any of the above-incorporated references can comprise all or a portion of any of the video analysis services available for selection by a user hereof. Other video analysis techniques in development by Xerox and its affiliates will be added to the present system as such services are finalized and brought online.

A "video analysis result" is a result generated by a video analysis module having completed analyzing the video. Such results may take a variety of forms including, for example, a curve, plot, chart, graph, text, a numeric or binary value, an audible sound, and the like. Such a result may also comprise one or more modifications having been made to the video as a result of the processing. Video analysis results are communicated to the user. The video analysis result may be communicated via email, voicemail, text messaging, a social network site, and the like, including sending the analysis result directly to the user's printer. Communicating the video analysis result may also involve displaying a result on a display device viewable by the user. Example video analysis results displayed for the user are shown and discussed with respect to FIGS. 7 and 9. The video analysis result may be communicated to a web page and the user provided with a link to that page where the user can view, edit, modify, annotate, and/or download the results. Communicating the video analysis result to the user in intended to include communicating the results to a third party and storing the results to a storage device for subsequent retrieval. A fee may be associated with each of the video analysis results.

Figure 5:
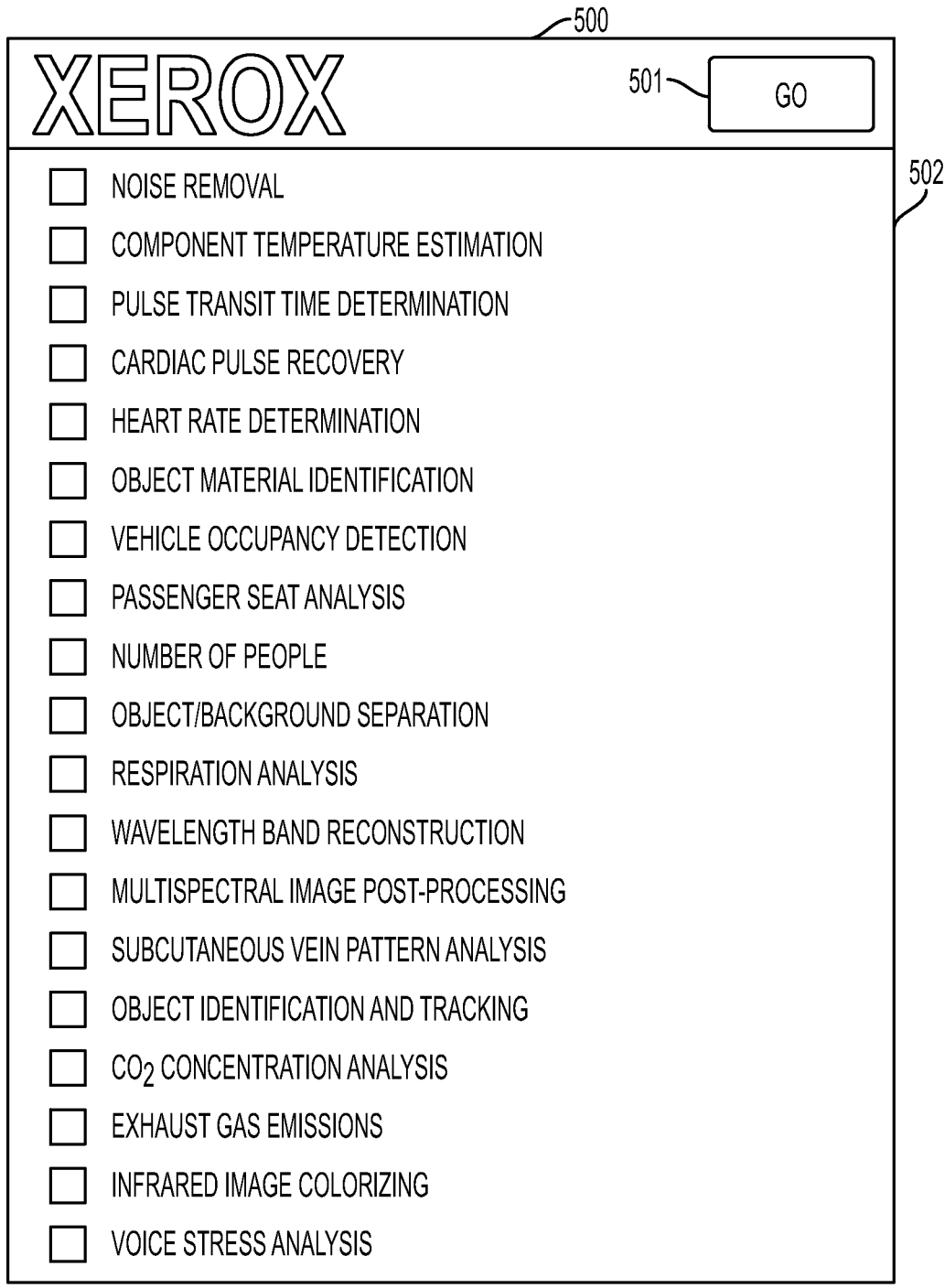
FIG. 5 illustrates one example embodiment of a display screen which provides a plurality of selectable menu options to the user.

A "selectable menu option" refers to a user-selectable software object (used interchangeably herein with "icon" and "widget") which is displayed on a graphical display of a user's computing device and which is made selectable through a physical interaction therewith, such as clicking a mouse button while a cursor is nearby or over the widget, as is widely understood by practitioners of the web surfing art. Widgets generally take the form of a GIF (Graphics Interchange Format), as is known in the computer science arts. A GIF is a small pictogram used to visually supplement the set of alphanumeric characters on a computing device. Some GIFs have a movement associated with them such that they appear to interact with the user and may further have an associated audio/video file which is played upon a user interaction. Widgets are preferably constructed to provide the user with a visual representation of the task which that option invokes, where feasible. Selectable menu options have one or more properties associated with them which, in response to a user selection thereof, are cause the operating system to initiate a predefined hardware and/or software application, function, or capability. A page of user selectable menu options associated with each of a plurality of video analysis modules is shown in FIG. 5.

A "region of interest" in a given video is an area of the camera's field of view containing one or more subjects of interest. The region of interest can be the whole scene or a portion of a scene. Example regions of interest are shown and discussed with respect to 610 and 611 of FIG. 6. A region of interest in a video can manually be entered by the user watching the video on their display device and using a pointed device to define or otherwise highlight a rubber-band box around one or more areas of one or more images in their video containing subjects of interest. A region of interest in a given scene of a video wherein a subject of interest is located in the video may be identified automatically conventional object tracking software (e.g. via motion, color, shape etc.). A region of interest in a given scene may be fixed such as, for instance, the upper right corner of the camera's field of view or a doorway or hallway in a restricted area such that anybody or anything that passes into that area automatically becomes the subject of interest in the video. The subject of interest in the video can also be defined by a triggering event. For example, a new object is detected entering the scene in the video so the new object becomes the subject of interest and the portion of the video images containing that object defines the region of interest. In various embodiments, the selected regions of interest in the video are communicated to the server and those regions in the video are processed with respect to the user-selectable menu options. A fee may be associated with some or all of the video analysis services available for selection.

A "materials spectra database" (MSD) refers to a database of different materials for which reflectances in the visible and IR wavelength ranges have been determined apriori with respect to various representative sets of known materials. Example databases are shown at 205, 206, and 207 of FIG. 2. In one embodiment, each of the video analysis modules is placed in communication with their own respective MSD depending on the analysis function they are intended to perform. One materials spectral database is the High-Resolution Transmission Molecular Absorption Database (HITRAN) which is maintained by the Atomic and Molecular Physics Division of the Harvard-Smithsonian Center for Astrophysics. The HITRAN database of materials spectra is downloadable from Harvard's website.

Example Networked System

Reference is now being made to FIG. 1 which illustrates one embodiment of a communication network through which various computing devices effectuate a communication between a user and a server in accordance with various aspects hereof.

In FIG. 1, network 102 provides a communication pathway through which various user computing device enable a user to communicate with server 103. The set of user computing devices enabled by the example network include a personal digital assistant (PDA) 104, a personal computer (PC) 105, a handheld cellular device 106, and a handheld computing device such as iPad 107, or any other network-enabled computing devices which typically incorporate a processor, memory, storage device, and an operating system for running a wide variety of diverse applications. Wireless network system includes one or more information processing systems 108 communicatively coupled to network 102 via gateway 109 couple the user's computing devices to server 103 via wide area network (WAN) 110, local area network (LAN) 111, or Cable/Telephone Network 112. The present network can be placed in communication with satellites and handsets capable of utilizing satellite communication. It should be appreciated that, although user devices 104 and 107 are shown having been placed in communication with server 103 via cellular tower 113, it should be appreciated that device 106 may also communicate with the server in a similar manner. The embodiment of server 103 is intended to represent one example computing platform wherein various aspects of the present method are implemented. Server platforms may be further enable to create service proxies for directing requests for applications from a client device to a platform that is hosting the requested application and for redirecting responses from that hosting platform back to the requesting client device. One computer platform may act as a server to processors resident onboard another computing platform. Dedicated servers are available from a variety of vendors in various streams of commerce. Also shown is video camera 114 connected to desktop computer 105 with cable 115. A user may use the computer 105 to upload video captured using video camera 114 to server 103. It should be appreciated that any of the computing devices may be placed in communication with such a video camera or may have the functionality of a video camera, as broadly defined herein, built into the device to capture video. Moreover, the user interfaces of any of these computing devices such as the keypad 116 of the cellular phone 106 or the touchscreen 119 of iPad 107 may be used to effectuate a user selection of any of the menu options received from a server and displayed on their respective display device 117 and 119, respectively.

Example Server

Figure 2:
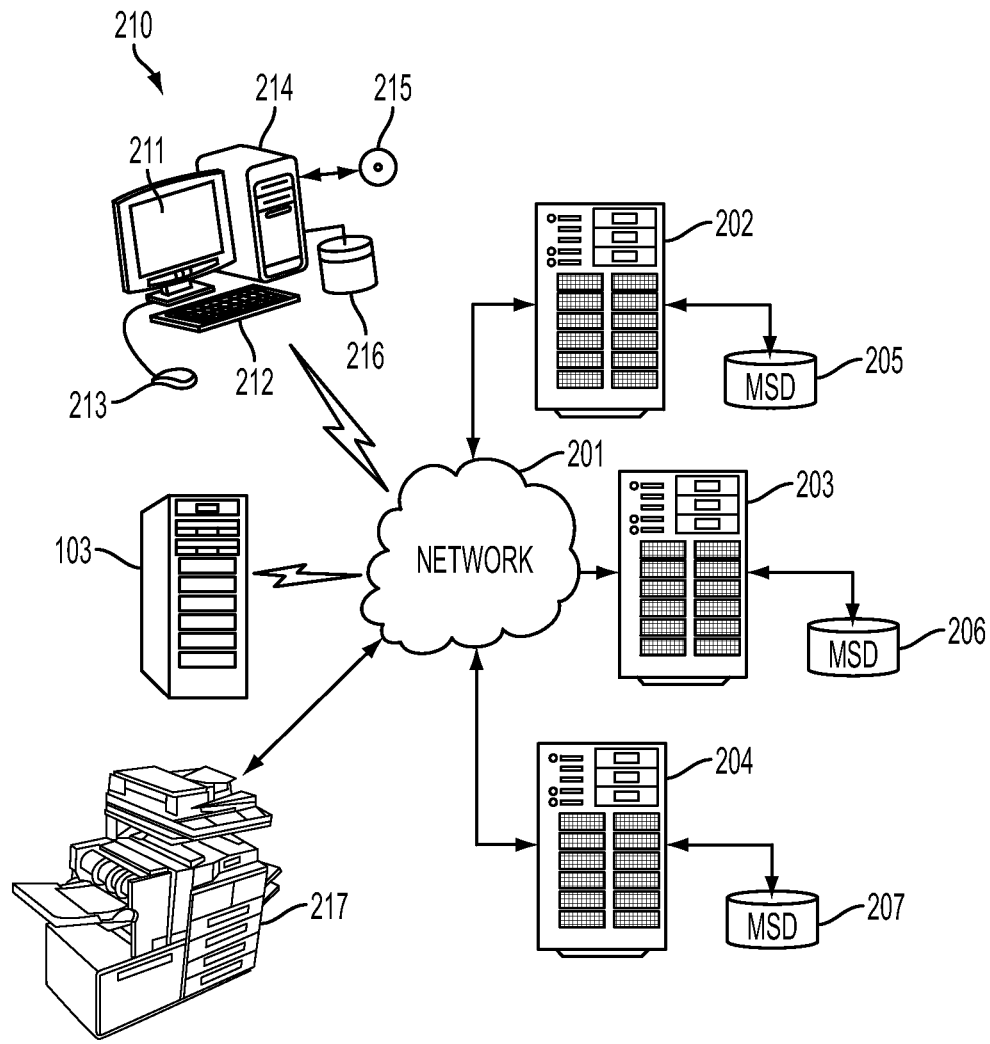
FIG. 2 illustrates the server of FIG. 1 placed in networked communication with a plurality of video analysis modules.

Reference is now being made to FIG. 2 which further illustrates the server 103 of FIG. 1 in networked communication with a plurality of video analysis modules in accordance with various aspects of the teachings hereof.

Server 103 is shown in wireless communication with network 201 which, in alternative embodiments, may be any of the networks 110, 111, and 112 of FIG. 1. Also shown in communication with network 201 are hardware embodiments of video analysis modules 202, 203 and 204. Each of these hardware implementations is shown having an associated materials spectra database (MSD), 205, 206, and 207, respectively, wherein reflectance values of different materials are stored as needed, including formulas, mathematical representations, variables, data, plots, tables, graphs, and the like, as may be needed by each respective module to perform its intended function. Hardware embodiments of these modules may be connected to server 103 via a wired connection using, for instance, cable, fiber optic, phone line, or other medium. Computer workstation 210 is also in communication with server 103 and any of the video analysis modules via wireless network 201. Computer 210 includes a display 211 such as a CRT or LCD for the visual display of video analysis results, and a keyboard 212 and mouse 213. Workstation 210 includes a hard drive (internal to computer case 214) which reads/writes to computer readable media 215 such as a floppy disk, optical disk, CD-ROM, DVD, magnetic tape, etc. Case 214 also houses a motherboard with a processor and memory, a network card, graphics card, and the like, and other software and hardware. Computer system 210 is shown with storage device 216. Also shown is a multifunction document reproduction device 217 placed in networked communication with any of the devices of FIG. 1 such that video analysis results can be reduced to hardcopy form where desired.

It should be appreciated that the computer workstation 210 can be configured to modify some or all of the functionality performed by server 103. Similarly, workstation 210 can also be configured to enable an operator to modify some or all of the functionality performed by any of the video analysis modules 202, 203, 204. For example, workstation 210 can create, edit, and modify information displayed on any of the web pages served by the server, and communicate those to a storage device such as a memory or hard drive (internal to server 103). The video may be uploaded to the server directly and communicated to the workstation upon receipt thereof by the server. Alternatively, the video may be retrieved from a remote device by any of the devices of FIG. 2 over network 201. The menu options selected by the user and any other selections such as regions of interest, video frames, objects of interest, people of interest, and the like, can be received or retrieved by the server and communicated to the workstation. Selection of menu options and other information provided by the user can be received or retrieved by the server and communicated to the workstation for review by the operator. Alternatively, the server functions as a dumb client device whose function involves serving web pages upon request, while the workstation communicates with the server and performs the primary functions of the server to effectuate the teachings hereof.

Some or all of the received video may be played by an operator and viewed on the display device of workstation 210, as needed, to facilitate the kind of video analysis desired to be performed for the user. Such facilitation may take the form of the operator selecting one or more frames of the video for analysis and/or identifying regions of interest which need to be processed. The operator may further review the user's selections and further review any of the regions of interest selected by the user for processing. The operator may direct certain video frames or portions of the video to certain video analysis modules in order that the best video analysis result is achieved. The video analysis result may also be provided to the workstation by the video analysis modules for review by the user in advance of the results being communicated to the user. The operator may modify the results as needed and re-direct the modified results back to the same or different video analysis modules for further processing or re-processing. Upon viewing the video analysis results, the user may select different regions of interest and provide those to other analysis modules for processing or re-processing. In other embodiments, the video analysis results are provided directly to the server and communicated back to the user without review. Some or all of the functionality performed by the server may be performed by the workstation having been configured to run server software. Moreover, some or all of the functionality performed by any of the video analysis modules may be performed by the workstation implementing either software and/or hardware embodiments thereof. Such alternatives are intended to fall within the scope of the appended claims.

A First Display Screen

Figure 3:
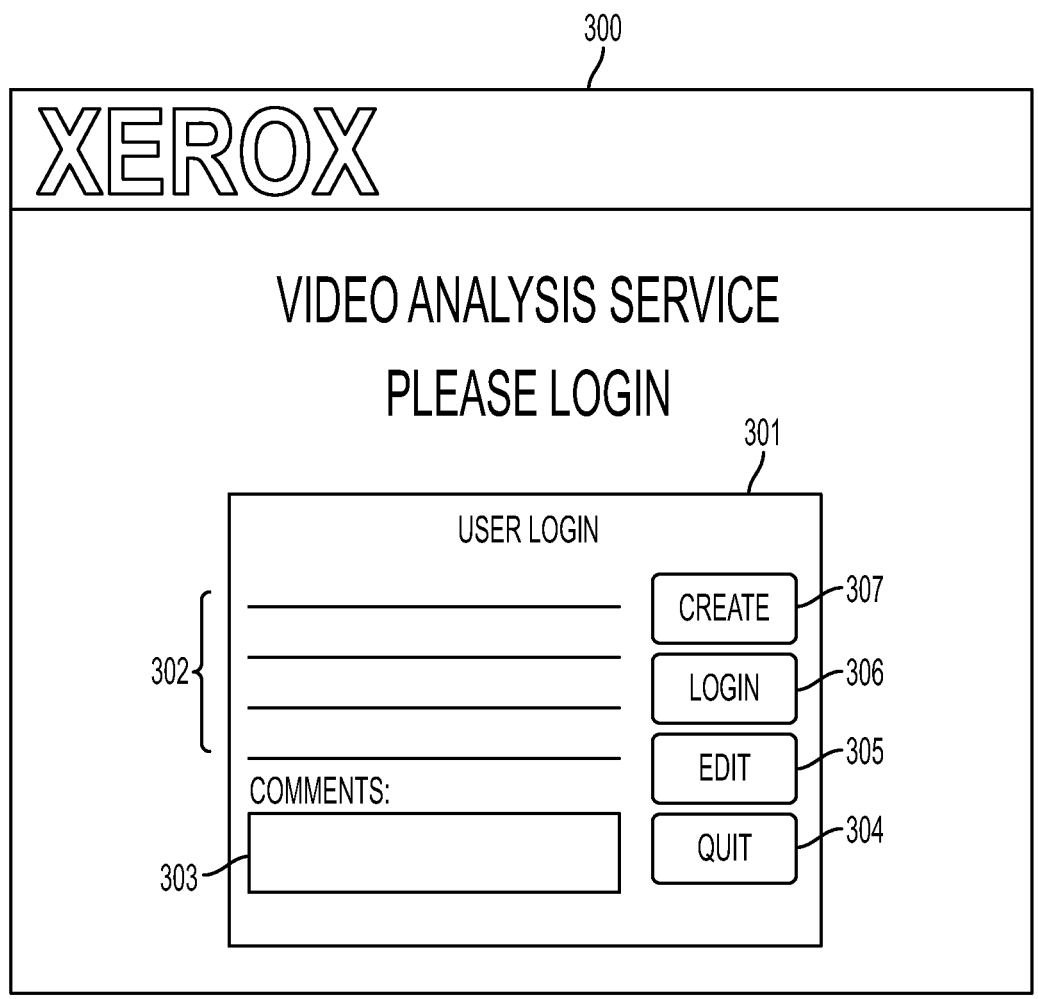
FIG. 3 illustrates one example embodiment of a display screen provided by the server of FIGS. 1 and 2 to the user's computing device wherein the user logs into their account to utilize the service effectuated by the present system and method.

Reference is now being made to FIG. 3 which illustrates one example display screen provided by the server of FIGS. 1 and 2 to the display of the user's computing device wherein the user logs into their account on the Xerox site.

The user of the Xerox web-based video analysis service has connected their particular computing device, such as any of the user computing devices of FIGS. 1 and 2, to the Xerox server 103 which, in turn, executes an application 300 providing a screen 301 which enables the user to log into the site. In this embodiment, the user provides their user name and password, collectively at 302, and enters any comments they wish to make, at 303. Also provided are a plurality of selectable buttons which, in this embodiment, allow the user to QUIT 304 if they desire, to EDIT 305 their input and comments, LOGIN 306 to the site, and CREATE 307 an account for this service if they do not already have one. Upon the server accepting the user's username and password as being associated with a valid account, the user is then asked for their video. The video may be uploaded directly to the server by the user's computing device in real-time as the video is being captured by the user, or the user uploads a previously acquired video file to be analyzed. The user may direct the server to a location or file folder on the user's computing device or elsewhere, where the video file can be obtained or otherwise retrieved. In one embodiment, the user directs the server to a hyperlink which places the server in communication with one or more video cameras and the server proceeds to acquire the user's video to be analyzed directly from those cameras in real time, or the server retrieves previously acquired video files from the camera's memory or storage device. It should be appreciated that the illustrated screen of FIG. 3 is for discussion purposes and the actual frontend of the web-based services hereof may take on an entirely different form having a different configuration altogether. Other embodiments may not require the user to login or create an account at all, while still other embodiments require the user to enter additional information such that the user can be vetted in advance of providing the user with an account such as, for example, Xerox limiting one or more video analysis techniques to researchers, law enforcement, homeland security, to name a few.

A Second Display Screen

Reference is now being made to FIG. 4 which illustrates one example display screen 400 displayed upon the user having successfully logged into the Xerox site and upon the server having successfully obtained the video intended to be analyzed. In this example, the user has uploaded a video 402 of a person of interest pulling a handcart behind them which is loaded with packages. Such a person may be walking, for instance, through an airport or through a security checkpoint and the video is provided to the server in real-time for analysis. The video may comprise only a few image frames or a single image frame with or without an audio component associated therewith. Also shown on the example screen 400 are a plurality of buttons 403 which, in a manner which is well known to video users, collectively enable the user to play their video in a forward and reverse direction including a stop, and a fast forward and a fast reverse capability. Buttons 404 and 405 allow the user to navigate to the previous screen or proceed to the next screen once the user has completed reviewing the displayed video. The REGION OF INTEREST button 401, upon a user selection thereof, jumps to a display screen where the user selects one or more regions of interest in one or more frames of the video, as discussed herein further with respect to the display screen of FIG. 6. The example display screen of FIG. 4 should not be viewed as limiting the teachings hereof to this particular embodiment which is provided for explanatory purposes.

A Third Display Screen

Reference is now being made to FIG. 5 which illustrates a next example screen 500 displayed for the user which shows a plurality of selectable menu options, collectively at 502, available to be performed on the video. In another embodiment, the user enters the type of video camera used to capture the video and one or more of the available video analysis modules are not displayed or are otherwise greyed-out so that those analysis modules which do not apply to the user's video cannot be selected by the user. Each of the menu options shown corresponds to one of the teachings of one of the above-incorporated references. Other modules will be added and made available online in due course. Associated with each of the menu option selections is a box that the user checks by, for instance, clicking with a mouse or touching on a touchscreen display. After the user has selected the video analysis server desired to be performed on the video, the user clicks on the GO button 510. Each of the selectable menu options of FIG. 5 is associated with at least one of the video analysis modules of FIG. 2. Although the embodiment of FIG. 2 only shows three modules for explanatory purposes, in the embodiment discussed with respect to FIG. 5, there would be more video analysis modules. In this embodiment, there is one video analysis module associated with each of the selectable menu options 502. The example display screen of FIG. 5 should not be viewed as limiting the teachings hereof to this particular embodiment which is provided for explanatory purposes. Upon the user having made their menu option selection and subsequently having selected GO 501, the server directs the video 402 to each of the selected video analysis modules.

A Fourth Display Screen

Figure 6:
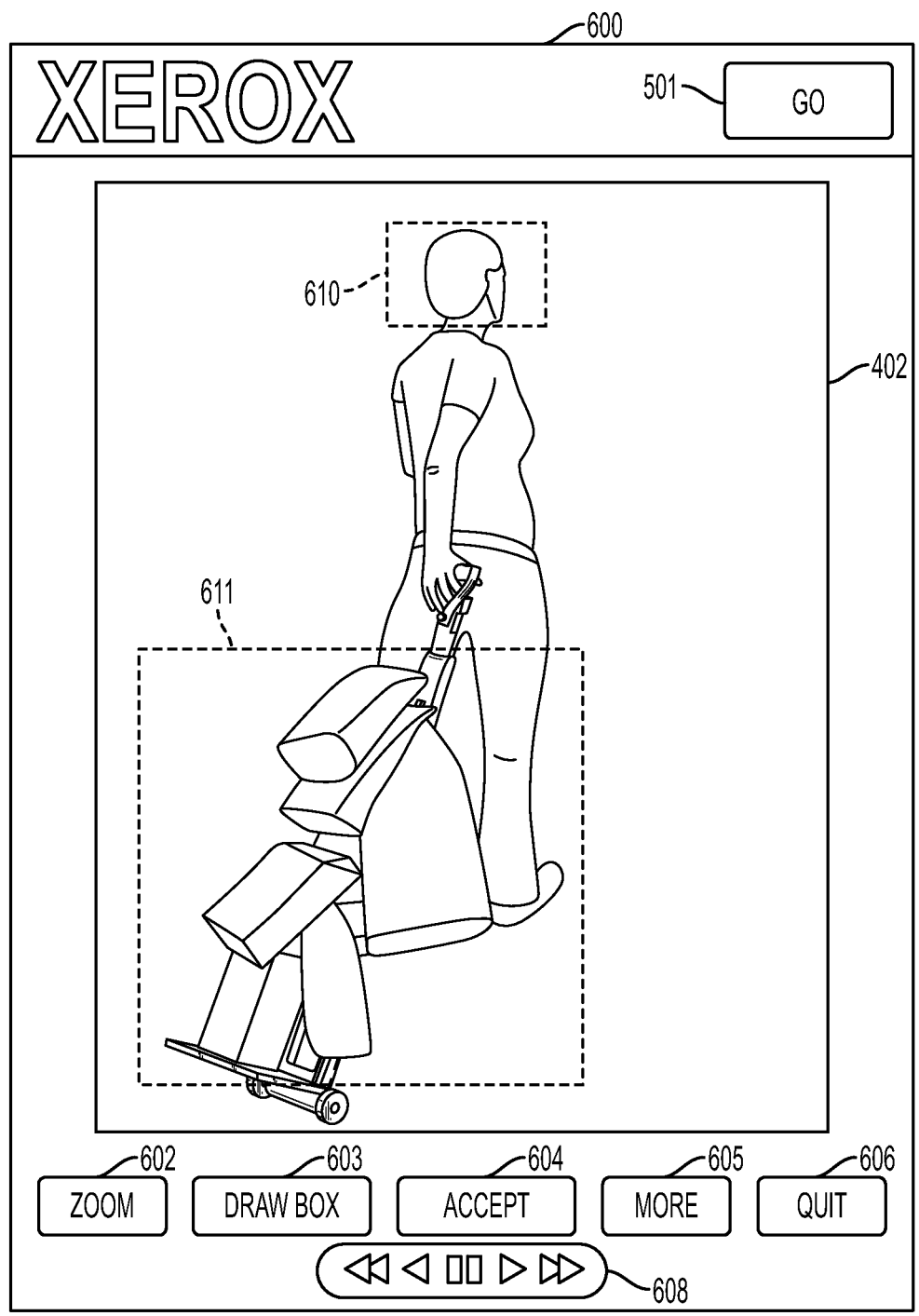
FIG. 6 illustrates one example embodiment of a display screen which enables the user to select one or more regions of interest in one or more frames of the video.

Reference is now being made to FIG. 6 which illustrates one example embodiment of a display screen 600 which enables the user to select one or more regions of interest in one or more frames of the video 402 in response to the user having selected button 401 of FIG. 4.

In the embodiment of FIG. 6, the user is enabled to highlight or otherwise identify one or more regions of interest in the video which the user intends to be analyzed. To effectuate a user selection of one or more regions of interest, a plurality of selectable buttons are provided to the user in this particular embodiment. The selectable button labeled ZOOM 602 invokes an application which enables the user to zoom in/out on an image. The DRAW BOX 603 button invokes an application which enables the user to draw a rubber-band box around a portion of the image. Example rubber-band boxes are shown at 610, 611, 612 and 613. The ACCEPT 604 button enables the user to accept the placement of a drawn rubber-band box. The MORE 605 button enables the user to drawn another rubber-band box which will be accepted by the user one the user is satisfied with that boxes placement in the image. The QUIT 606 button exits this screen session and returns the user back to the previous display screen. As discussed with respect to buttons 403 of FIG. 4, buttons 608 enable the user to play their video in a forward and reverse direction, stop at a particular image frame, and fast forward and fast reverse the video.

With respect to the user-selected regions of interest, the user hereof has drawn a rubber-band box defining region of interest 610 around the head of the person in the video because the user is interested, in part, with having the video analyzed so that the movement of the person can be tracked. Perhaps the user has selected this region of interest because it contains exposed skin and the user desires to have the video analyzed with respect to heart rate in order to determine if the person in the video has an accelerated heart rate and thus is nervous for some reason. In another embodiment where a facial recognition capability is enabled, the user may have drawn rubber-band box 610 around the person's head so that the video can be analyzed such that the identity of that person can be obtained. Rubber-band box 611 has been drawn by the user around the cluster of packages being pulled behind this person which the user hereof is interested in analyzing this region of the video for material composition.

After the user has finished selecting regions of interest, the user clicks on the GO button 501 and the server proceeds to send the video to each of the selected video analysis modules. Information about the X,Y coordinates defining the boundaries of each of the rubber-band boxes along with the marked image frame(s) are also provided to each respective module. In another embodiment, the user associates each of the selected regions of interest with a type of analysis desired to be performed on each of those regions and that information is communicated by the server to the respective video analysis modules. The example display screen of FIG. 6 should not be viewed as limiting the teachings hereof to this particular embodiment which is provided for explanatory purposes. Upon completion of each selected video analysis module's respective analysis, the video analysis results are communicated to the user.

A Fifth Display Screen

Figure 7:
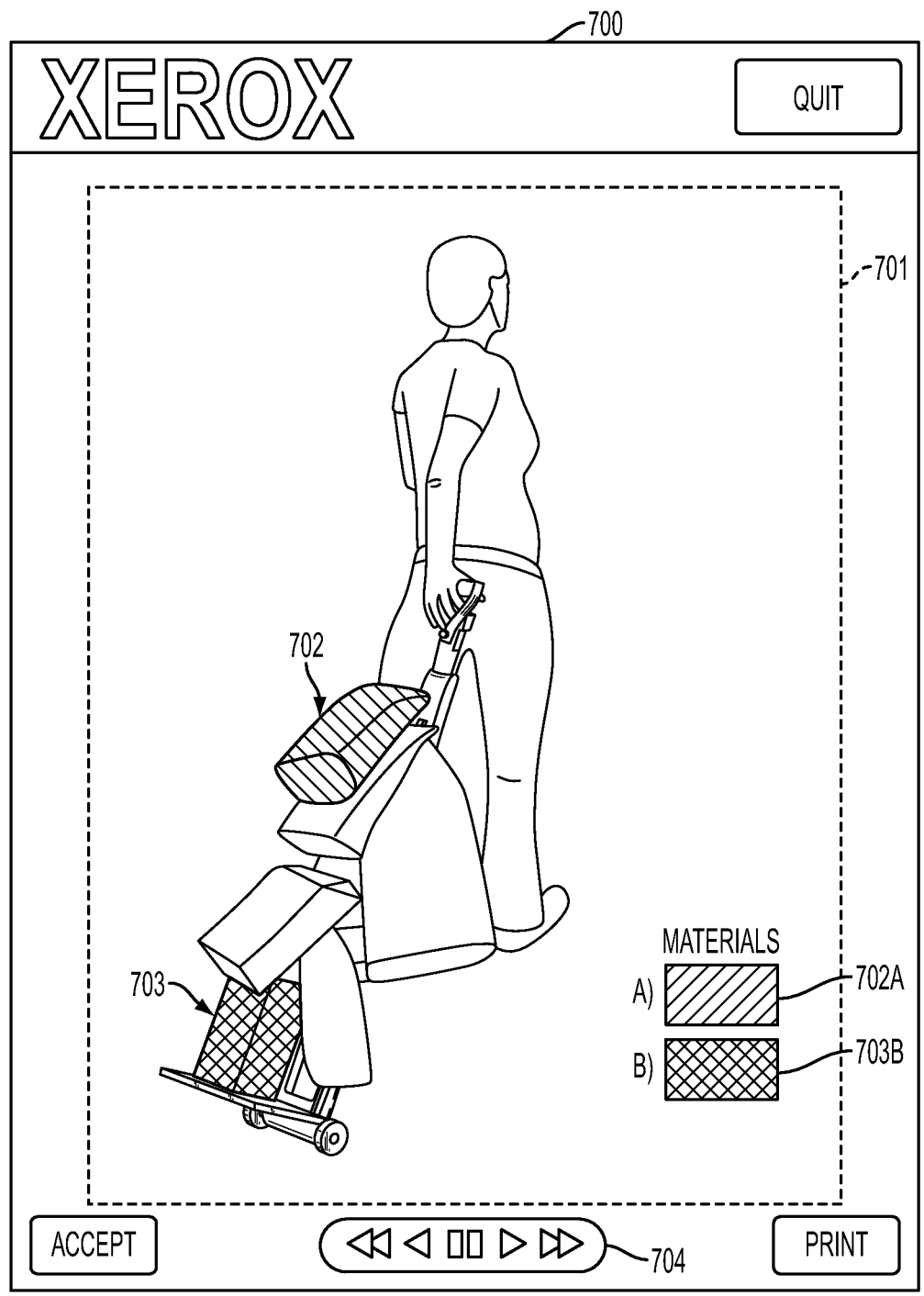
FIG. 7 illustrates one example embodiment of a display screen which communicates the video analysis results to the user.

Reference is now made to FIG. 7 which illustrates one example embodiment of a display screen 700 wherein the video analysis results 701 are communicated to the user. The video analysis module has completed its function of analyzing the video with for material composition in the region of interest 611 of FIG. 6. The analysis concludes that the material comprising packages 702 and 703 have been identified as materials 702A and 703A, respectively, which indicates that explosives have been detected. The remaining packages were not determined to comprise any hazardous material but rather were simply paper and cardboard. Buttons 704 enable the user to play their video in a forward and reverse, stop, and fast forward and fast reverse the video results. The display screen showing the video analysis results of FIG. 7 is but one example embodiment and should not be viewed as limiting.

A Second Example Video and Analysis Results

Reference is now being made to FIG. 8 which illustrates another example embodiment of a display screen 800 showing a video 801 of a speaker 802 at a podium 803 giving a speech with the video having been provided to the server 103 of FIGS. 1 and 2 in real-time for analysis. In the embodiment of FIG. 8, the video of the speaker is to be analyzed in real time with respect to progressive physiological changes as the person delivers their speech. In this embodiment, video analysis modules are available for analyzing a video in real-time for heart rate, respiration rate, and skin temperature. The server receives the video signal and directs those signals to each respective video analysis module for real-time processing with the results being communicated back to the server for real-time display.

Figure 9:
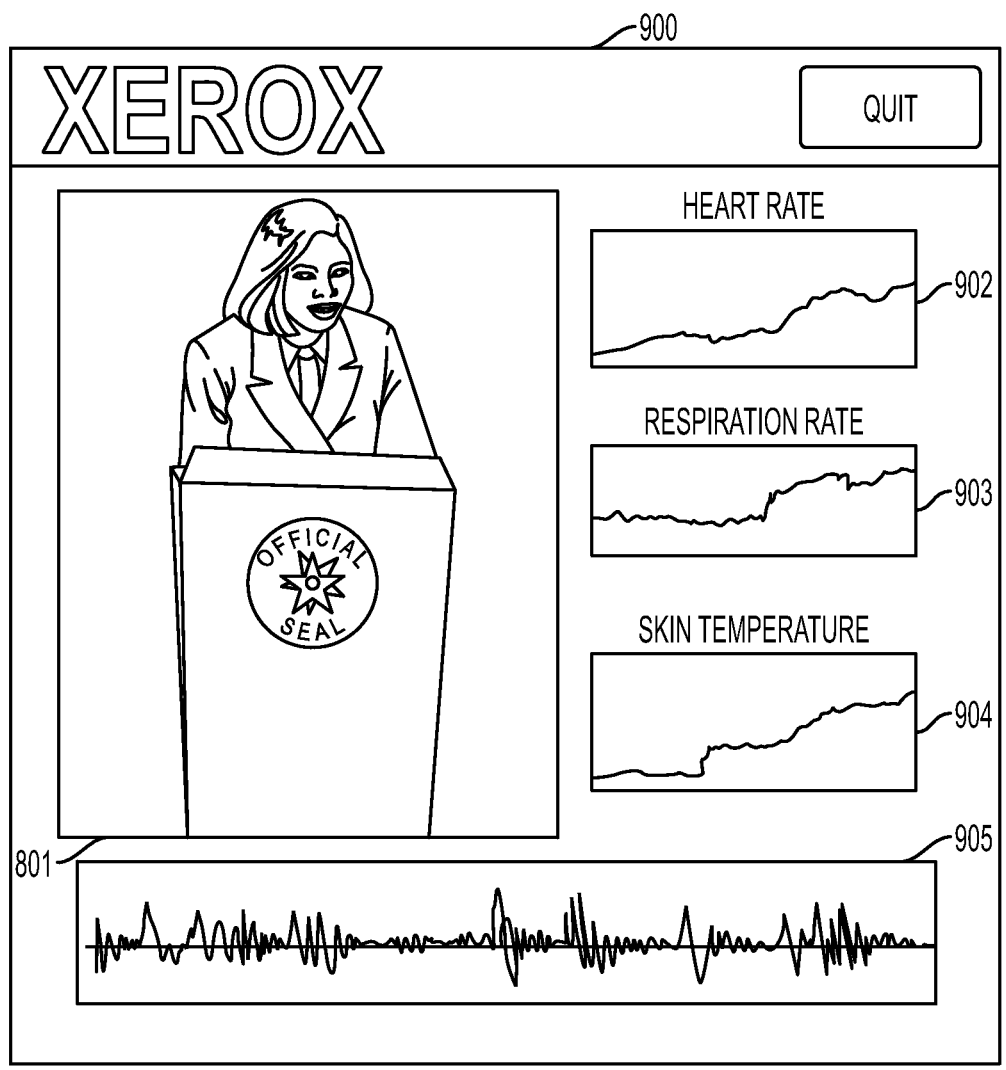
FIG. 9 illustrates an example embodiment of a display screen showing the video analysis results of the video of FIG. 8 being analyzed in real-time with respect to a plurality of physiological conditions.

FIG. 9 shows one example display screen 900 with the live video 801 of the speaker being displayed on one portion of the screen and the video analysis results being displayed on another portion of the screen with the video analysis occurring in real-time. In this example, the speaker's heart rate is being plotted over time at 902. The speaker's respiration rate is shown in plot 903. The speaker's skin temperature (detected from the exposed skin of the face in the video) is shown plotted in real-time at 904. The voice stress analysis of the speaker's voice contained in the audio component of the video signal is plotted in real-time at 905. FIGS. 8 and 9 illustrate example embodiments of video being acquired by the server in real-time, the video being analyzed in real-time, and the video analysis results being communicated to the user (via display screen 900) in real-time. In another embodiment, a voice stress analysis is also being performed on the audio portion of the video with the results also being displayed in real-time. It should be appreciated that the video of the speaker can be captured apriori and uploaded to the server for video analysis after the fact with the same video analysis results being displayed. Such an embodiment will prove useful in helping audience members and those watching the speaker's speech determine for themselves the veracity of the speaker.

Flow Diagram of One Embodiment

Figure 10:
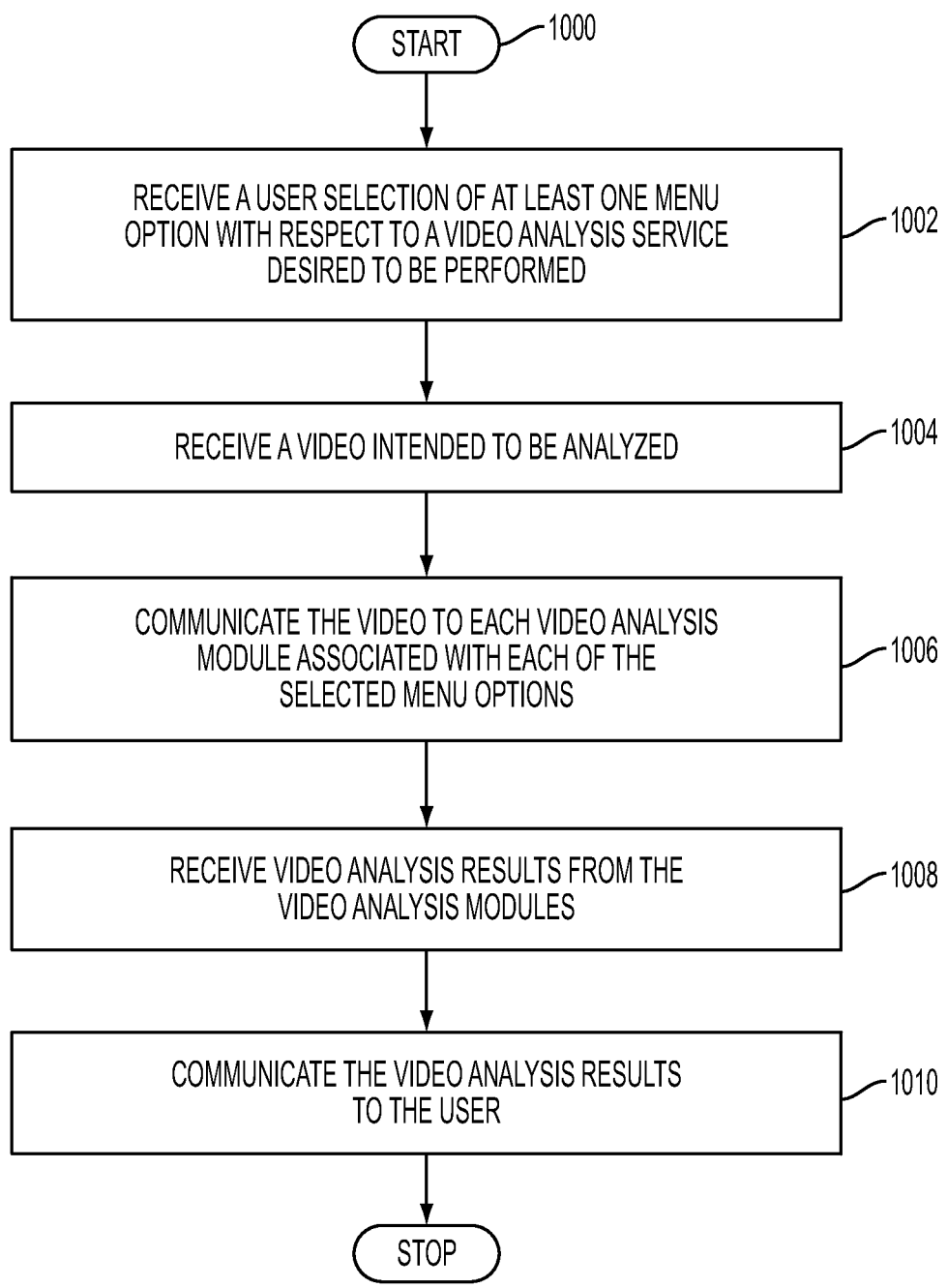
FIG. 10 is a flow diagram which illustrates one example embodiment of the present method for web-based video analysis service.

Reference is now being made to the flow diagram of FIG. 10 which illustrates one example embodiment of the present method for performing a video analysis service. Flow processing begins at 1000 and immediately proceeds to step 1002.

At step 1002, receive a user selection of at least one menu option with respect to a video analysis service desired to be performed. The menu selection is received from the user's computing device. Example user computer devices are shown and discussed with respect to FIG. 1. Selectable menu options associated with each of a plurality of video analysis modules are shown and discussed with respect to FIG. 5.

At step 1004, receive a video intended to be analyzed with respect to the selected menu options. The user can upload the video to be analyzed directly to the server or direct the server to obtain the video from a third device. In an alternative embodiment, the user directs the server to acquire the video in real-time.

At step 1006, communicate the video to a video analysis module associated with each of the selected menu options. Each of the video analysis modules analysis the captured video and produces a video analysis result.

At step 1008, receive video analysis results from the video analysis modules.

At step 1010, communicate the video analysis results to the user. Example video analysis results communicated back to the user are shown and discussed with respect to the example results of FIGS. 7 and 9. In this particular embodiment, further processing stops.

It should be appreciated that the flow diagrams hereof are illustrative. One or more of the operative steps illustrated in the flow diagram may be performed in a differing order. Other operations, for example, may be added, modified, enhanced, condensed, integrated, or consolidated. Such variations are intended to fall within the scope of the appended claims. All or portions of the flow diagrams may be implemented partially or fully in hardware in conjunction with machine executable instructions.

Various Embodiments

It should also be appreciated that various modules of any of the above-described illustrations may designate modules comprising software and/or hardware. A plurality of modules may collectively perform a single function. A module may comprise a single piece of hardware such as an ASIC, electronic circuit, or special purpose processor capable of executing machine readable program instructions. A plurality of modules may be executed by either a single system or a plurality of systems operating in parallel. Connections between modules include both physical and logical connections. Modules may further incorporate an operating system, drivers, device controllers, and other apparatuses some or all of which may be connected via a network. The teachings hereof can be implemented in hardware or software using any known or later developed systems, structures, devices, and/or software by those skilled in the applicable arts without undue experimentation with a general knowledge of the relevant arts.

One or more aspects of the methods described herein are intended to be incorporated in an article of manufacture, including one or more computer program products, having computer usable or machine readable media. The article of manufacture may be included on at least one media readable by a machine architecture. The article of manufacture may be shipped, sold, leased, or otherwise provided separately or as part of an add-on, update, upgrade, or product suite. It will be appreciated that alternatives hereof may be combined into other different systems or applications. Various presently unforeseen or unanticipated alternatives, modifications, variations, or improvements may become apparent and/or subsequently made by those skilled in the art, are also intended to be encompassed by the following claims. The embodiments set forth above are illustrative. Changes to any of the above-described embodiments may be made without departing from the spirit and scope of the invention.

What is claimed is:

1. A method for performing a web-based video analysis service, comprising:
   receiving, from a user's computing device over a network, a user selection of at least one menu option with respect to a video analysis service desired to be performed;
   receiving a video intended to be analyzed with respect to said selected options;
   communicating said video to said video analysis modules associated with said selected menu options;
   receiving a video analysis result from each of said video analysis modules; and
   communicating said received video analysis results to said user.

2. The method of claim 1, wherein said video is captured using any of: a RGB camera, a single channel infrared camera, a multispectral camera, a hyperspectral camera, and a combination of a visible and an infrared camera.

3. The method of claim 2, wherein said infrared camera captures images in the wavelength range of any of: Visible, Near Infrared (NIR), Short Wave Infrared (SWIR), Mid Wave Infrared (MWIR), and Long Wave Infrared (LWIR).

4. The method of claim 1, wherein said video analysis is performed with respect to any of: a static physiological condition of a person in said video, and a progressive physiological change of a person in said video.

5. The method of claim 4, wherein said physiological condition comprises any of: cardiac pulse frequency, heart rate, blood flow, blood pressure, respiration rate, concentration of gases in exhaled breath, skin temperature, and bodily movement.

6. The method of claim 1, wherein at least one of said menu options comprises an analysis to be performed on an audio portion of said video.

7. The method of claim 1, further comprising associating a fee with each of said video analysis services.

8. The method of claim 1, further comprising requiring said user to log onto a website using user-specific account information.

9. The method of claim 8, further comprising charging said user's account for having performed said video analysis service.

10. The method of claim 1, wherein said video analysis result is communicated to said user via any of: email, voicemail, text messaging, a social network website, an audible signal, a web page containing said video analysis results, and a hyperlink to a web page containing said video analysis results.

11. The method of claim 1, further comprising:
   modifying said video; and
   communicating said modified video to said user's computing device.

12. The method of claim 1, further comprising requesting a feedback from said user.

13. The method of claim 1, further comprising receiving, from said user, at least one region of interest identified in said video, said selected regions of interest being analyzed with respect to said user selected menu options.

14. A web-based system for a real-time video analysis service, the system comprising:
   a plurality of video analysis modules, each performing a different type of analysis on a user-provided video captured by a video camera of a subject of interest;
   a server comprising, at least in part, a processor in communication with a user's computing device over a network, said processor executing machine readable program instructions for performing:
      receiving a user selection of at least one menu option with respect to a video analysis service desired to be performed;
      receiving a video intended to be analyzed with respect to said selected menu options;
      communicating said video to said video analysis modules associated with said selected menu options;

receiving a video analysis result from said video analysis modules; and communicating said received video analysis results to said user.

15. The web-based system of claim 14, wherein said video is captured using any of: a RGB camera, a single channel infrared camera, a multispectral camera, a hyperspectral camera, and a combination of a visible and an infrared camera.

16. The web-based system of claim 15, wherein said infrared camera captures images in the wavelength range of any of: Visible, Near Infrared (NIR), Short Wave Infrared (SWIR), Mid Wave Infrared (MWIR), and Long Wave Infrared (LWIR).

17. The web-based system of claim 14, wherein said video analysis is performed with respect to any of: a static physiological condition of a person in said video, and a progressive physiological change of a person in said video.

18. The web-based system of claim 17, wherein said physiological condition comprises any of: cardiac pulse frequency, heart rate, blood flow, blood pressure, respiration rate, concentration of gases in exhaled breath, skin temperature, and bodily movement.

19. The web-based system of claim 14, wherein at least one of said menu options comprises an analysis to be performed on an audio portion of said video.

20. The web-based system of claim 14, further comprising associating a fee with each of said video analysis services.

21. The web-based system of claim 20, further comprising charging said user's account a fee for having performed said video analysis service.

22. The web-based system of claim 14, wherein said video analysis result is communicated to said user via any of: email, voicemail, text messaging, a social network website, an audible signal, a web page containing said video analysis results, and a hyperlink to a web page containing said video analysis results.

23. The web-based system of claim 14, further comprising:

modifying said video; and communicating said modified video to said user's computing device.

24. The web-based system of claim 14, further comprising requesting a feedback from said user.

25. The web-based system of claim 14, further comprising receiving, from said user, at least one region of interest identified in said video, said selected regions of interest being analyzed with respect to said user selected menu options.

* * * * *